H. MELCHIOR.
SHEARS.
APPLICATION FILED MAY 1, 1908.
910,008.
Patented Jan. 19, 1909.
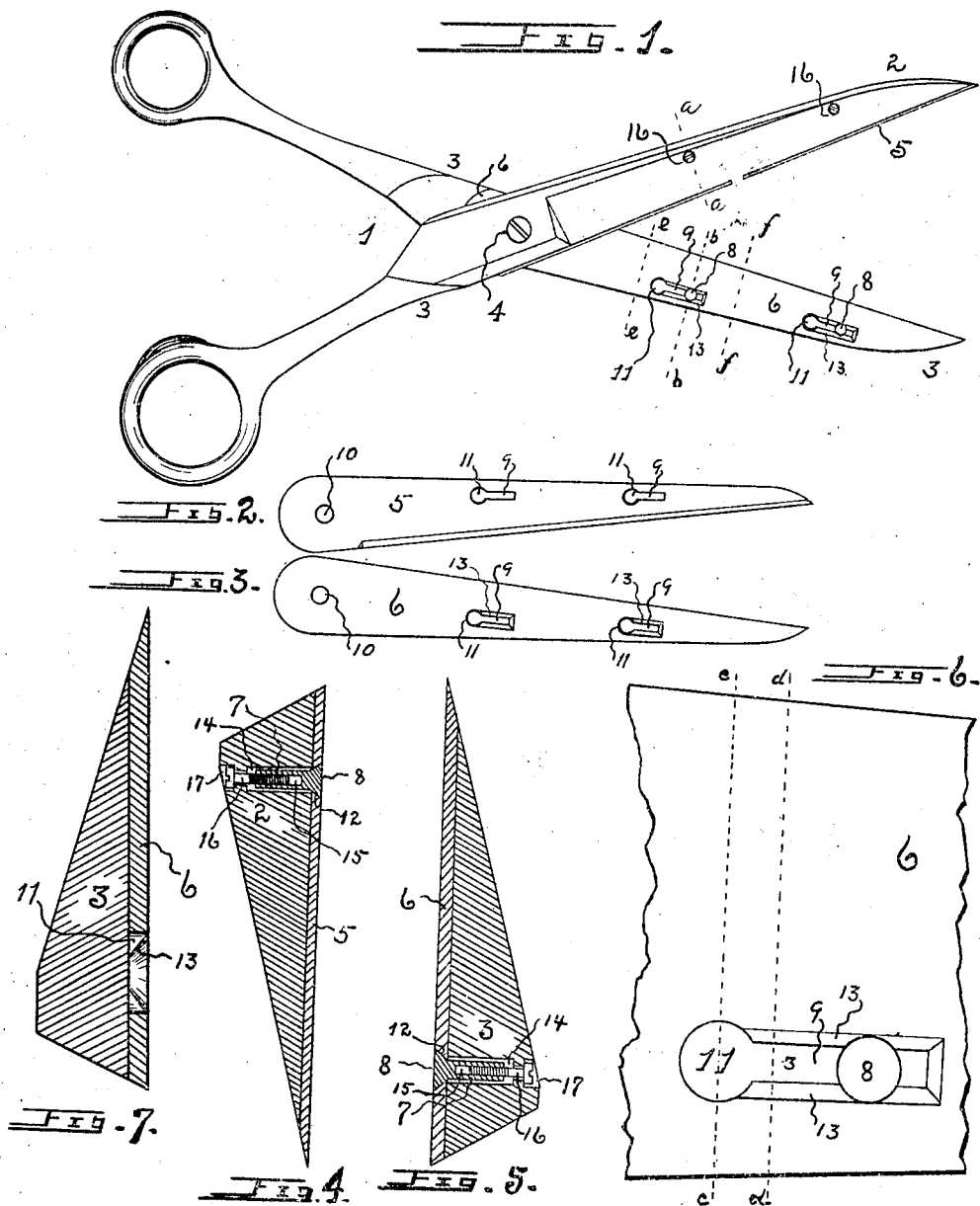
Witnesses—
George W. Covell
Samuel MacLeod
Hugo Melchior
Inventor,
By Hiram A. Sturges
Attorney

UNITED STATES PATENT OFFICE.

HUGO MELCHIOR, OF OMAHA, NEBRASKA.

SHEARS.

No. 910,008.　　　Specification of Letters Patent.　　Patented Jan. 19, 1909.

Application filed May 1, 1908. Serial No. 430,297.

*To all whom it may concern:*

Be it known that I, HUGO MELCHIOR, a citizen of the United States, residing at Omaha, in the county of Douglas and State of Nebraska, have invented certain new and useful Improvements in Shears, of which the following is a specification.

This invention relates to improvements in shears of the class provided with removable cutting blades, and has for one of its objects the provision of effective and reliable means for holding the blades upon the arms of the shears, and which will be durable in wear. Means for these purposes heretofore shown, in some instances, depend upon the formation of holding-flanges formed either upon the shear-arms or upon the cutting blades; in other instances the means for holding the blades depend upon the use of screws with countersunk heads, the same not being practical for use in connection with shears of light construction, since the cutting blades, upon this class must be as thin as possible, and since these screw-heads contact with the cutting blades, they also must have a light construction, and are, therefore liable to become broken.

In the present invention, flattened rivet heads are used for a contact with the cutting blades, and the blades may, therefore be constructed extremely thin for use upon shears of smaller sizes.

Another object of the invention is to provide means whereby the blades may be quickly and conveniently removed, or placed operatively upon the holding-arms.

The invention consists of the combination and arrangement of parts, as described herein, pointed out by the claim, and as illustrated by the accompanying drawing, wherein,—

Figure 1 is a side view of a pair of shears, with removable cutting-blades mounted thereon, embodying my invention. Figs. 2 and 3 are side views of the cutting-blades shown in Fig. 1. Figs. 4 and 5 are sectional views, respectively, upon lines *a a* and *b b* of Fig. 1, looking to the handle of the shears, these views being somewhat enlarged. Fig. 6 is a side view showing a portion of a shear arm and blade, being a view taken between lines *e e* and *f f* of Fig. 1, and enlarged to clearly show relative position of parts. Fig. 7 is a sectional view taken between lines *c c* and *d d* of Fig. 6 looking to the rivet-head, to clearly show the walls of the slot.

Referring now to the drawing for a more particular description, numeral 1 indicates a pair of shears, the well known parts of which may be constructed of very cheap material, and for convenience, arms 2 and 3 may be considered as blanks, for the mounting thereon of cutting blades.

The pivot of the shear arms is indicated at 4, and I construct cutting blades 5 and 6, now to be described, and to be mounted upon the inner surfaces, respectively, of arms 2 and 3.

I provide rivets 7, secured to the shear arms, and having heads 8 projecting from the plane of the inner walls of said shear arms, these rivet heads being for engagement with cutting blades 5 and 6, as will be explained.

I form slots 9 longitudinally of blades 5 and 6; at the end of each slot, nearest pivot-aperture 10 thereof, is provided an opening 11 through the blade, this opening being somewhat larger than the rivet head so that the latter may pass therethrough; the slot has a width less than that of the rivet-head, and by reason of the construction, the blades may be very quickly removed from or operatively placed upon the shear-arms.

It will be understood that the distance apart of openings 11 of the blades, correspond with the distances from one of rivet-heads 8 to another, upon arms 2 or 3, and to operatively place either of the cutting-blades upon its respective arm, the blade is seated upon the shear-arm so that openings 11 are passed by heads 8; the blade is then moved lengthwise until aperture 10, near the end of the blade, is in alinement with screw or rivet 4 of the shear-arms, and after arms 2 and 3 are secured by rivet 4, the cutting-blade is held upon the arm upon which it has been placed, since a part of the blade is secured beneath the rivet-head. The convenience for adjustment, just described will be appreciated by those who use the devices mentioned, and a change of blades, upon the arms, may be quickly effected, since there are no screws to be loosened or removed; the blades are slidable upon the inner walls of the holding-arms to effect an alinement of openings 10 with pivot 4, at which time heads 8 are keepers or holders upon the blades, and within slots 9. Rivet heads 8, 110 preferably, have their annular side walls 12 formed outwardly-flaring toward their flat ends, and walls 13 of slots 9 are formed outwardly divergent from the inner to the outer sides of the blades, so that the heads of the rivets may have an adequate bearing upon the blades, to hold them upon the arms.

As thus described, the ends of the rivet heads are upon the same planes as the outer sides of cutting-blades 5 and 6 after these blades are mounted upon arms 2 and 3, and since these heads do not have the channels common to screw-heads, they are less liable to breakage, than screws.

Rivets 7 may be held in arms 2 and 3 in any convenient manner, or may be formed integral with the arms, if desired; and the blades may be used in connection with the heads of said rivets regardless as to how the rivets are held, as is obvious. A good construction for holding the rivets, especially for shears of larger sizes is plainly shown in Figs. 1, 4, 5 and 6, and I have used the same to advantage. Apertures 14 are formed transversely through arms 2 and 3 to receive rivets 7, said rivets having longitudinal recesses 15 with threaded interior walls to engage compression-members or screws 16. Countersunk recesses 17 are formed upon the outer walls of the arms to receive the heads of screws 16, although this feature is not important. By reason of the threaded connection of said screws and rivets, blades 5 and 6 may be pressed closely upon the arms, and this is particularly useful where the cutting-blades are heavy; and in this construction the screw heads may be of any desired size since they are used upon the outer wall of the holding-arms. The advantage of this construction will be readily apparent, since screw-heads are not employed for making contact with the cutting-blades, and the weakness, heretofore pointed out, of such a construction, is avoided.

According to the construction as described, the cutting-blades may be manufactured very economically; they may be very thin, and this is desirable since high grade material is used; also slots 9 may be readily formed without aid of expensive machinery, and, as described, the parts are durable and the blades may be readily taken from or placed upon the holding-arms. As is obvious, the number of slots 9 upon blades 5 and 6 and the corresponding projections or heads 8 of the arms, need not be limited to the exact number shown and described; it will also be seen that a blade could be held upon an arm by a single projection or rivet-head engaging the walls of a slot, provided rivet 4 of the shears traversed aperture 10, near the rear end of the blade; and it is equally true that apertures 10 may be dispensed with as a holding means when two or more projections 8 upon the arms are employed in connection with slots 9 of the blades.

Having fully described my invention, what I claim as now and desire to secure by United States Letters Patent, is,—

In a device of the character described, the combination with a pair of pivotally mounted shear arms, of a pair of cutting blades, each of said cutting blades having a key hole slot formed therein and a two part binding member for binding said blades against said shear arms, one part of said binding member comprising a bevel headed and internally threaded member and the other part of said binding member comprising a headed screw adapted to enter said internally threaded member, said shear arm having an opening formed therein for the passage of said binding member and having a shoulder against which the head of said screw bears, the walls of the reduced portion of the key hole slot being beveled to conform to the bevel head of the internally threaded member, the head of said member lying flush with the outer face of the cutting blade, substantially as shown and described.

In testimony whereof I have affixed my signature in presence of two witnesses.

HUGO MELCHIOR.

Witnesses:
HIRAM A. STURGES,
GEO. C. HENNINGS.